A. PETRIW AND A. PETLAK.
NUT LOCK.
APPLICATION FILED MAR. 20, 1920.
1,346,975.
Patented July 20, 1920.
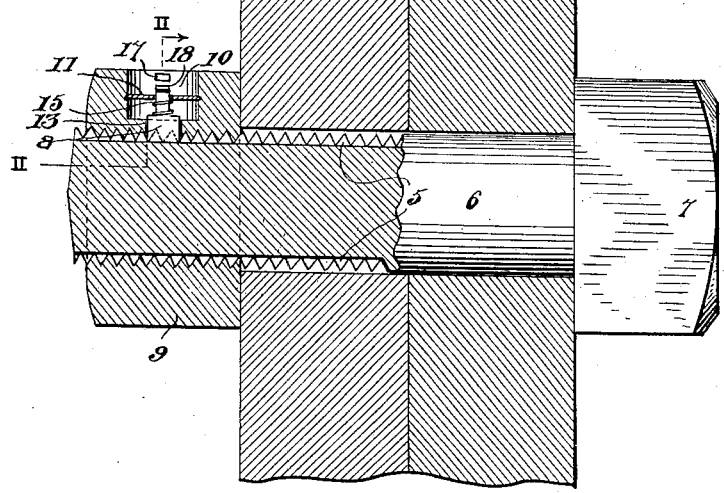
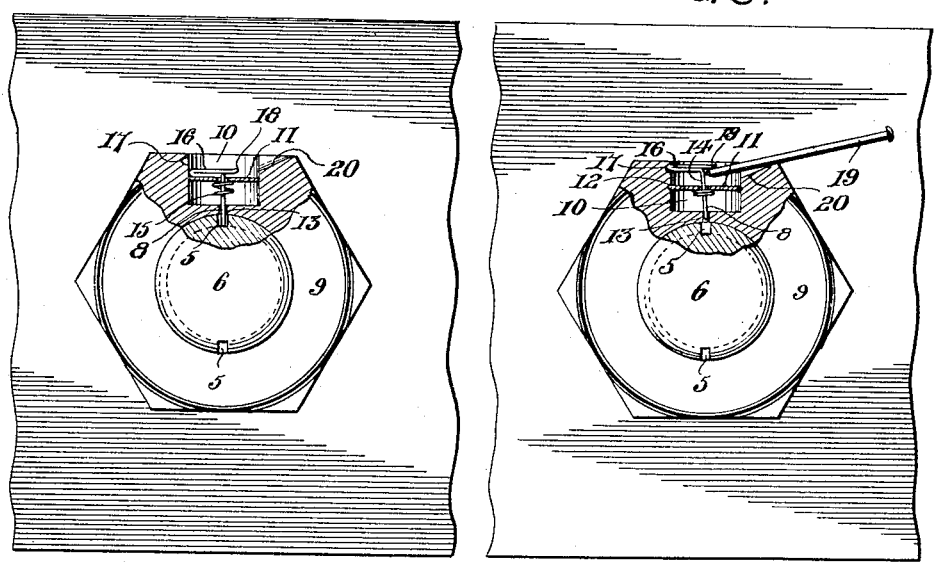
Inventors
A. Petriw
A. Petlak
By N. M. Wilson
Attorney

UNITED STATES PATENT OFFICE.

ALECK PETRIW AND ALECK PETLAK, OF GOODEVE, SASKATCHEWAN, CANADA.

NUT-LOCK.

1,346,975. Specification of Letters Patent. Patented July 20, 1920.

Application filed March 20, 1920. Serial No. 367,336.

*To all whom it may concern:*

Be it known that we, (1) ALECK PETRIW and (2) ALECK PETLAK, citizens of Ukraine, residing at Goodeve, in the Province of Saskatchewan and Dominion of Canada, have invented certain new and useful Improvements in Nut-Locks, of which the following is a specification.

This invention relates to certain new and useful improvements in nut locks of that type wherein the nut is provided with a spring seated cross key adapted for selective reception within one of a plurality of longitudinal peripheral slots provided in the shank of the bolt.

The principal object of the present invention is to provide a nut lock of the above type which may be comparatively cheaply and easily manufactured as well as easily placed in use, the construction being such that a nut is effectively held against accidental displacement from a bolt although capable of being removed intentionally by a person familiar with the operation of the same.

With the above object in view and others that will become apparent as the nature of the invention is better understood, the same consists in the novel form, combination and arrangement of parts hereinafter more fully described, shown in the accompanying drawing and claimed.

In the drawing wherein like reference characters indicate corresponding parts throughout the several views, Figure 1 is a view partly in central longitudinal section and partly in side elevation of a bolt and nut coöperatively constructed in accordance with the present invention and shown clamping two bolts together, Fig. 2 is an end elevational view, partly in section upon line II—II of Fig. 1 with the cross key seated, Fig. 3 is a view similar to Fig. 2 with the cross key unseated by the use of a nail or similar equivalent member, and Fig. 4 is a plan view of a portion of one of the plates and the nut shown in Fig. 1.

Referring more in detail to the several views, the present invention contemplates the provision of radial longitudinally extending peripheral grooves 5 in the threaded shank 6 of a bolt provided with a head 7 at one end, the grooves 5 being adapted for selective reception of a spring seated cross key 8 carried by a nut 9 which is threaded upon the shank 6.

A nut 9 may be of any desired angular formation and is provided with a socket 10 extending inwardly from one of its flat faces, and a partition 11 is suitably fastened centrally in the socket 10. The partition 11 may be composed of a resilient disk capable of being dished so as to be sprung into an annular groove 12 provided in the walls of the socket 10. A slot 13 in the nut 9 provides communication between the bore of the nut and the socket 10 thereof, and the cross key 8 is slidably disposed in the slot 13 as well as in a central slot 14 provided in the partition 11. A spring 15 encircles the cross key 8 and has one end fastened to said key, while its other end bears against the partition 11 so that the key 8 is normally pressed inwardly to enter one of the grooves 5 when the same is arranged coincident with the slot 13 of the nut 9 as shown in Fig. 2. The cross key 8 is preferably formed of sheet material having considerable rigidity, and the outer end of the same is angularly and return bent to provide a cross head 16 which limits the inward movement of the key 8 by engaging the partition 11 as is also shown in Fig. 2. One end of the cross head 16 extends close to the wall of the socket 10 so that when the cross key 8 is raised as shown in Fig. 3, the same may enter a depression 17 provided in the wall of the socket 10 so as to assist in retaining the cross key 8 in released position or withdrawn from the groove 5. The extreme free end 18 of the head 16 is at all times slightly spaced from the partition 11 so as to permit the introduction of a nail 19 or the like thereunder for withdrawing the cross key 8 to released position, and an inclined groove 20 is provided in the face of the nut 9 leading to the socket 10 so as to permit the nail 19 to be easily introduced under the end portion 18 of the head 16.

It will be understood that in certain uses, it will be very desirable to provide a large number of the grooves 5, and it is accordingly not desired to have it understood that the present invention is limited to the use of only two of such grooves as is shown in the drawing.

In operation, the nail or similar instrument 19 is introduced under the end 18 of the cross key head 16 and such nail or instrument 19 is then rocked so as to pry the cross key outwardly to released position. With the cross key thus released, the shank 6 of the bolt may be readily threaded into the nut 9 for the desired distance, after which the cross key 8 is released for permitting the spring 15 to project the same through the slot 13 and into one of the grooves 5, in which position the nut is effectively prevented from rotating relative to the shank 6 so that the nut cannot be accidentally displaced.

It will thus be seen that we have provided a simple and effective form of nut lock which may be easily placed into practical use and which will be durable and efficient in operation.

Minor changes may be made without departing from the spirit and scope of the invention as claimed.

What we claim is:—

The combination with a bolt having a threaded shank provided with longitudinal peripheral grooves, of a nut having a socket extending inwardly from one of its side faces and provided with a slot centrally of the socket providing communication between the socket and the bore of the nut, a transverse partition secured centrally within said socket and having a central slot, a cross key slidable in the slots of the nut and the partition and having a cross head upon its outer end outwardly of the partition and arranged at all times within said socket, and a spring encircling said cross key and normally pressing the same inwardly for seating reception within one of the longitudinal grooves of the bolt shank when the latter is coincident with the slot of the nut, a portion of the cross head of said cross key being maintained slightly spaced from said partition so as to permit the insertion of the end of a nail or like instrument thereunder for prying the cross key outwardly so as to release the inner end of the latter from the longitudinal groove of the bolt shank, the wall of said socket being provided with a depression for reception of one end of the cross head of the cross key when the latter is pried outwardly so as to assist in maintaining the same in released position.

In testimony whereof we affix our signatures.

ALECK PETRIW.
ALECK PETLAK.